(12) United States Patent
Tang

(10) Patent No.: US 12,469,547 B2
(45) Date of Patent: Nov. 11, 2025

(54) METHOD FOR CONTROLLING NAND FLASH MEMORY TO COMPLETE NEURAL NETWORK OPERATION

(71) Applicant: UNIM Innovation (Wuxi) Co., Ltd., Wuxi (CN)

(72) Inventor: Qiang Tang, Wuxi (CN)

(73) Assignee: UNIM Innovation (Wuxi) Co., Ltd., Wuxi (CN)

( * ) Notice: Subject to any disclaimer, the term of this patent is extended or adjusted under 35 U.S.C. 154(b) by 127 days.

(21) Appl. No.: 18/534,957

(22) Filed: Dec. 11, 2023

(65) Prior Publication Data

US 2024/0194249 A1 Jun. 13, 2024

(30) Foreign Application Priority Data

Dec. 13, 2022 (CN) .......................... 202211595307.1

(51) Int. Cl.
*G11C 11/4096* (2006.01)
*G11C 11/408* (2006.01)
*G11C 11/4093* (2006.01)
*G11C 11/54* (2006.01)

(52) U.S. Cl.
CPC ...... *G11C 11/4096* (2013.01); *G11C 11/4085* (2013.01); *G11C 11/4093* (2013.01); *G11C 11/54* (2013.01)

(58) Field of Classification Search
CPC .................. G11C 11/4096; G11C 11/4085

USPC ................................................... 365/189.011
See application file for complete search history.

(56) References Cited

U.S. PATENT DOCUMENTS 11,791,840 B1 * 10/2023 Berman ................ G11C 16/26
714/764

* cited by examiner

*Primary Examiner* — Anthan Tran
(74) *Attorney, Agent, or Firm* — ZIEGLER IP LAW GROUP, LLC

(57) ABSTRACT

The present invention provides a method for controlling a NAND flash memory to complete neural network operation, including the following steps: providing a NAND flash memory, where the NAND flash memory includes multiple memory blocks and multiple page buffers, the memory block includes multiple synaptic strings, multiple bit lines, and multiple word lines, the synaptic string includes multiple memory cells connected in series, the synaptic strings are connected to the bit lines in one-to-one correspondence, the word line is connected to all the synaptic strings, the page buffer is connected to all the memory blocks, and one of the bit lines is merely connected to one of the page buffers; writing weight data into the memory cell according to a relationship between the weight data and the feature data; applying a target voltage to the memory cell by the word line; and sensing, by the page buffer, a current of the memory block, to obtain a convolution result. Thus, the neural network operation is achieved using a generic NAND flash memory.

6 Claims, 4 Drawing Sheets

METHOD FOR CONTROLLING NAND FLASH MEMORY TO COMPLETE NEURAL NETWORK OPERATION

FIELD OF TECHNOLOGY

The present invention relates to the technical field of the NAND flash memories, and in particular, to a method for controlling a NAND flash memory to complete neural network operation.

BACKGROUND

Neural network operation in the prior art is based on the NOR memory architecture or a ReRAM/PCM memory architecture, requiring a specific memory array structure with different standard memory arrays and requires a large number of peripheral circuits to support the neural network operation. These requirements cause high costs and are unsuitable for mass production.

Therefore, in order to resolve the foregoing problem in the prior art, it is necessary to provide a new method for controlling a NAND flash memory to complete neural network operation.

SUMMARY

An objective of the present invention is to provide a method for controlling a NAND flash memory to complete neural network operation, where the generic NAND flash memory is used to implement the neural network operation.

To achieve the foregoing objective, the method for controlling a NAND flash memory to complete neural network operation in the present invention includes the following steps:
S0: providing a NAND flash memory, where the NAND flash memory includes multiple memory blocks and multiple page buffers, the memory block includes multiple synaptic strings, multiple bit lines, and multiple word lines, the synaptic string includes multiple memory cells connected in series, the synaptic strings are connected to the bit lines in one-to-one correspondence, the word line is connected to all the synaptic strings, the page buffer is connected to all the memory blocks, and one of the bit lines is merely connected to one of the page buffers;
S1: writing weight data into the memory cell according to a relationship between the weight data and the feature data;
S2: applying a target voltage to the memory cell by the word line; and
S3: sensing, by the page buffer, a current of the memory block, to obtain a convolution result.

The method for controlling a NAND flash memory to complete neural network operation has the following beneficial effects: The weight data is written into the memory cell according to a relationship between the weight data and the feature data; the target voltage is applied to the memory cell by the word line; and the page buffer senses the current of the memory block, to obtain the convolution result. Thus, the neural network operation is achieved using a generic NAND flash memory.

Optionally, the feature data includes multiple pieces of sub-feature data, the weight data includes multiple pieces of sub-weight data, each sub-feature data corresponds to one of the memory blocks, and one of the pieces of sub-feature data corresponds to at least one of the pieces of sub-weight data.

Optionally, the writing weight data into the memory cell according to a relationship between the weight data and the feature data includes:
according to a correspondence between the sub-weight data and the sub-feature data, writing all pieces of sub-weight data corresponding to one of the pieces of sub-feature data into different memory cells of a memory block corresponding to the sub-feature data, and the different memory cells are connected to a common word line.

Optionally, the target voltage includes multiple sub-target voltages, the sub-target voltages are in one-to-one correspondence to the pieces of sub-feature data, and the applying a target voltage to the memory cell by the word line includes:
applying the sub-target voltages corresponding to the sub-feature data to all memory cells of the memory blocks corresponding to the sub-feature data, and holding the sub-target voltages through the word lines.

Optionally, the convolution result includes multiple sub-convolution results, the multiple sub-convolution results are used as new feature data, and steps 1 to 3 are repeated for performing a next layer of convolution operation.

Optionally, the sensing, by the page buffer, a current of the memory block, to obtain a convolution result includes:
dividing a sensing time of the page buffers into N sections;
discharging a pre-charge voltage of the page buffer via the bit line until the pre-charge voltage of the page buffers is smaller than a threshold voltage, and recoding this time period as an M-th section; and
obtaining the convolution result according to M and N, M and N being natural numbers greater than 0.

Optionally, the method for controlling a NAND flash memory to complete neural network operation further includes a calibration step, where the calibration step includes:
by using a memory cell with known weight data and feature data as a reference unit, calibrating the sensing time of the page buffers with reference to a current of the reference unit that is sensed by a corresponding one of the page buffers.

DESCRIPTION OF THE EMBODIMENTS

To make the objectives, technical solutions and advantages of the present disclosure more clearly, the following clearly and completely describes the technical solutions in the embodiments of the present disclosure with reference to the accompanying drawings in the embodiments of the present disclosure. Apparently, the described embodiments are merely a part rather than all of the embodiments of the present disclosure. Apparently, the described embodiments are merely some rather than all of the embodiments of the present invention. All other embodiments obtained by a person of ordinary skill in the art based on the embodiments of the present disclosure without creative efforts shall fall within the protection scope of the present disclosure. Unless otherwise defined, technical terms or scientific terms used herein shall have their ordinary meanings as understood by those of ordinary skill in the art to which the present disclosure belongs. The terms such as "include" used in this specification mean that the elements or objects mentioned before the terms encompass the elements, objects, or their equivalents listed after the terms, without excluding other elements or objects.

Figures 1, 2:
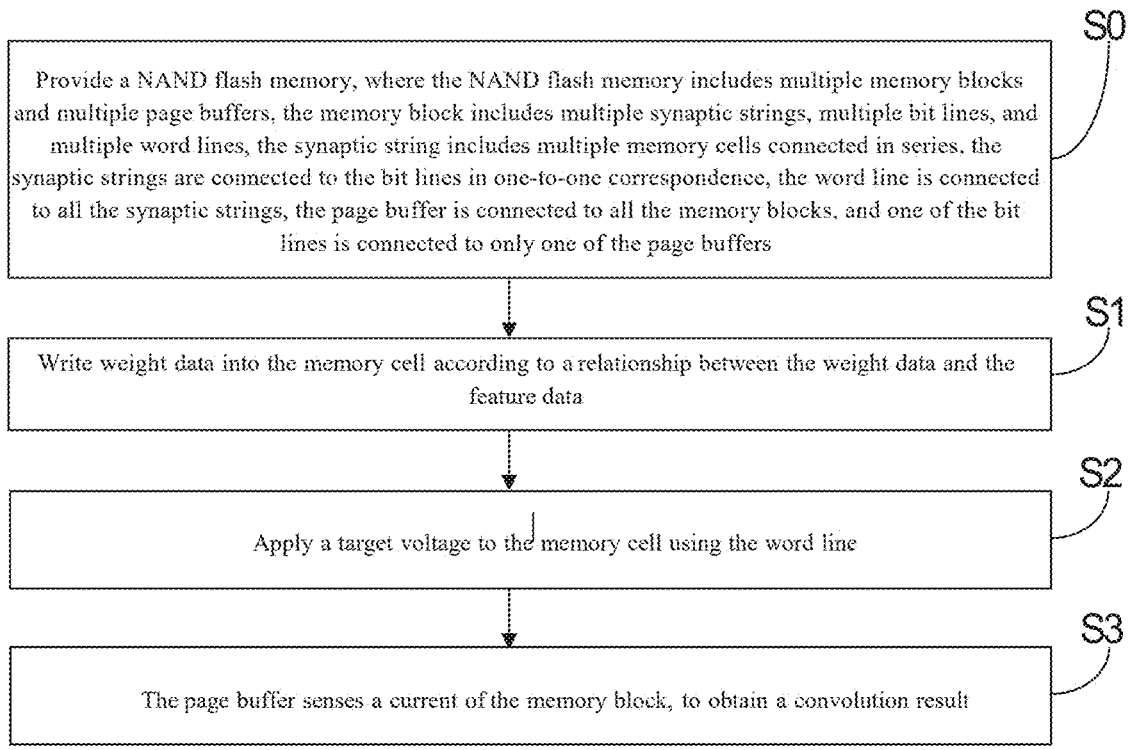
FIG. 1 is a flow chart of a method for controlling a NAND flash memory to complete neural network operation according to some embodiments of the present invention.
FIG. 2 is a schematic diagram of a model of feature data according to some embodiments of the present invention.

As for the problem existing in the related art, embodiments of the present invention provide a method for controlling a NAND flash memory to complete neural network operation. Referring to FIG. 1, the method for controlling a NAND flash memory to complete neural network operation includes the following steps:

S0: Provide a NAND flash memory, where the NAND flash memory includes multiple memory blocks and multiple page buffers, the memory block includes multiple synaptic strings, multiple bit lines, and multiple word lines, the synaptic string includes multiple memory cells connected in series, the synaptic strings are connected to the bit lines in one-to-one correspondence, the word line is connected to all the synaptic strings, the page buffer is connected to all the memory blocks, and one of the bit lines is merely connected to one of the page buffers.

S1: Write weight data into the memory cell according to a relationship between the weight data and the feature data.

S2: Apply a target voltage to the memory cell by the word line.

S3: The page buffer senses a current of the memory block, to obtain a convolution result.

In some embodiments, the feature data includes multiple pieces of sub-feature data, the weight data includes multiple pieces of sub-weight data, each sub-feature data corresponds to one of the memory blocks, and one of the pieces of sub-feature data corresponds to at least one of the pieces of sub-weight data.

In some embodiments, the step of writing weight data into the memory cell according to a relationship between the weight data and the feature data includes: according to a correspondence between the sub-weight data and the sub-feature data, writing all pieces of sub-weight data corresponding to one of the pieces of sub-feature data into different memory cells of a memory block corresponding to the sub-feature data, and the different memory cells are connected to a common word line. The sub-weight data corresponding to the sub-feature data that needs to be accumulated as a result is written into the memory cells of the different synaptic strings where the bit lines connected to the same page buffer are located. In addition, multiple pieces of sub-weight data in which the resultant correlation occurs are written to the memory cells, of different memory blocks, sharing some bit lines.

Optionally, the target voltage includes multiple sub-target voltages, the sub-target voltages are in one-to-one correspondence to the pieces of sub-feature data, and the applying a target voltage to the memory cell by the word line includes: applying the sub-target voltages corresponding to the sub-feature data to all memory cells of the memory blocks corresponding to the sub-feature data, and holding the sub-target voltages through the word lines.

In some embodiments, the convolution result includes multiple sub-convolution results, the multiple sub-convolution results are used as new feature data, and steps 1 to 3 are repeated for performing a next layer of convolution operation.

Figures 3, 4:
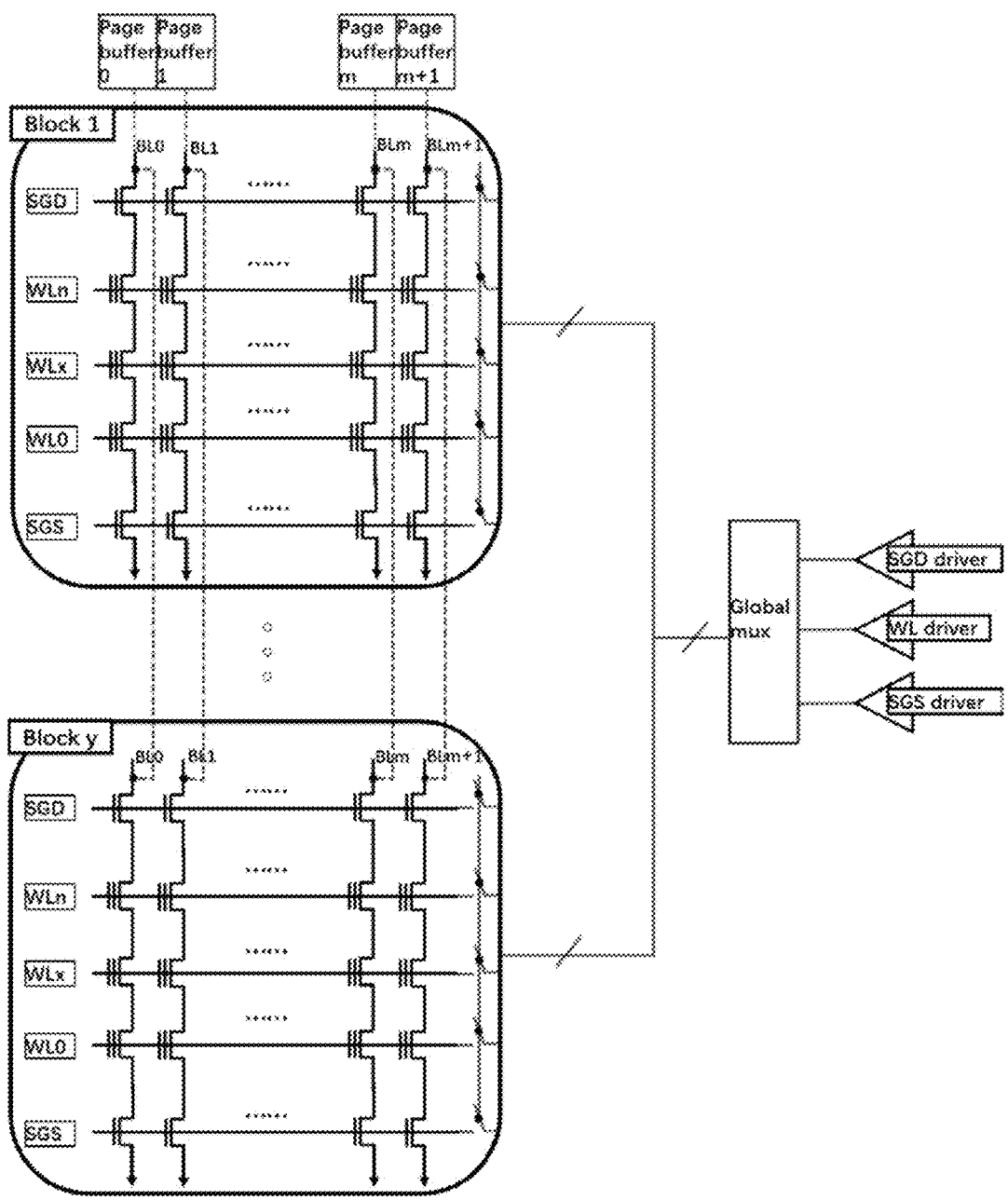
FIG. 3 is a schematic diagram of a model of weight data according to some embodiments of the present invention.
FIG. 4 is a schematic structural diagram of a NAND flash memory according to some embodiments of the present invention.

FIG. 2 is a schematic diagram of a model of feature data according to some embodiments of the present invention. FIG. 3 is a schematic diagram of a model of weight data according to some embodiments of the present invention. Referring to FIGS. 2 and 3, A1, A2, A3 to A23, A24, and A25 are sub-feature data, and W1, W2, W3 to W7, W8, and W9 are all sub-weight data.

Referring to FIGS. 2 and 3, when the conventional operation is performed, it includes nine conventional operation processes as follows:

A1×W1+A2×W2+A3×W3+A6×W4+A7×W5+A8×W6+A11×W7+A12×W8+A13×W9 is calculated to obtain the first sub-convolution result B1.

A2×W1+A3×W2+A4×W3+A7×W4+A8×W5+A9×W6+A12×W7+A13×W8+A14×W9 is calculated to obtain the second sub-convolution result B2.

A3+A4+A5+A8+A9+A10+A13+A14+A15 is calculated to obtain the third sub-convolution result B3;

A6+A7+A8+A11+A12+A13+A16+A17+A18 is calculated to obtain the fourth sub-convolution result B4;

A7+A8+A9+A12+A13+A14+A17+A18+A19 is calculated to obtain the fifth sub-convolution result B5;

A8+A9+A10+A13+A14+A15+A18+A19+A20 is calculated to obtain the sixth sub-convolution result B6;

A11+A12+A13+A16+A17+A18+A21+A22+A23 is calculated to obtain the seventh sub-convolution result B7;

A12+A13+A14+A17+A18+A19+A22+A23+A24 is calculated to obtain the eighth sub-convolution result B8; and A13+A14+A15+A18+A19+A20+A23+A24+A25 is calculated to obtain the ninth sub-convolution result B9.

The sub-weight data W1 corresponds to the sub-feature data A1. The sub-weight data W1 and the sub-weight data W2 correspond to the sub-feature data A2. The sub-weight data W1, the sub-weight data W2, and the sub-weight data W3 correspond to the sub-feature data A3. The sub-weight data W2 and the sub-weight data W3 correspond to the sub-feature data A4. The sub-weight data W3 corresponds to the sub-feature data A5. The weight data W1 and the weight data W4 correspond to the sub-feature data A6. The sub-weight data W1, the sub-weight data W2, the sub-weight data W4, and the sub-weight data W5 correspond to the feature data A7. The sub-weight data W1, the sub-weight data W2, the sub-weight data W3, the sub-weight data W4, the sub-weight data W5, and the sub-weight data W6 correspond to the sub-feature data A8. The sub-weight data W2, the sub-weight data W3, the sub-weight data W5, and the sub-weight data W6 correspond to the sub-feature data A6. The sub-weight data W3 and the sub-weight data W6 correspond to the sub-feature data A10. The sub-weight data W1, the sub-weight data W4, and the sub-weight data W7 correspond to the sub-feature data A11. The sub-weight data W1, the sub-weight data W2, the sub-weight data W4, the sub-weight data W5, and the sub-weight data W8 correspond to the sub-feature data A12. The sub-weight data W1, the sub-weight data W2, the sub-weight data W3, the sub-weight data W4, the sub-weight data W5, the sub-weight data W6, the sub-weight data W7, the sub-weight data W8, and the sub-weight data W9 correspond to the sub-feature data A13. The sub-weight data W2, and the sub-weight data W3, the sub-weight data W5, the sub-weight data W6, the sub-weight data W8, and the sub-weight data W9 correspond to the sub-feature data A14. The sub-weight data W3, the sub-weight data W6, and the sub-weight data W9 correspond to the sub-feature data A15. The sub-weight data W4 and the sub-weight data W7 correspond to the sub-feature data A16. The sub-weight data W4, the sub-weight data W5, the sub-weight data W7, and the sub-weight data W8 correspond to the sub-feature data A17. The sub-weight data W4, the sub-weight data W5, the sub-weight data W6, the sub-weight data W7, the sub-weight data W8, and the sub-weight data W9 correspond to the sub-feature data A18. The sub-weight data W5, the sub-weight data W6, the sub-weight data W8, and the sub-weight data W9 correspond to the sub-feature data A19. The sub-weight data W6 and the sub-weight data W9 correspond to the sub-feature data A20. The sub-weight data W7 corresponds to the sub-feature data A21. The sub-weight data W7 and the sub-weight data W8 correspond to the sub-feature data A22. The sub-weight data W7, the sub-weight data W8, and the sub-weight data W9 correspond to the sub-feature data A23. The sub-weight data W8 and the sub-weight data W9 correspond to the sub-feature data A24. The sub-weight data W9 corresponds to the sub-feature data A25.

FIG. 4 is a schematic structural diagram of a NAND flash memory according to some embodiments of the present invention. Referring to FIG. 4, the NAND flash memory includes y memory blocks and m+2 page buffers. The memory block includes m+2 synaptic strings, m+2 bit lines, and three word lines, a drain-side selection gate line, and a source-side selection gate line. The synaptic string includes a drain-side selector, a source-side selector, and three memory cells. The three memory cells are a first memory cell, a second memory cell, and a third memory cell, respectively. The drain-side selector, the first memory cell, the second memory cell, the third memory cell, and the source-side selector are sequentially connected in series. The drain-side selector in the first synaptic string is connected to the first bit line, and the drain-side selector in the second synaptic string is connected to the second bit line. By analog, the drain-side selector in the m+1-th synaptic string is connected to the m+1-th bit line, and the drain-side selector in the m+2-th synaptic string is connected to the m+2-th bit line.

Referring to FIG. 4, the first bit lines of the first memory block 1 to the y-th memory block are all connected to the first page buffer, and the second bit lines of the first memory block to the y-th memory block are all connected to the second page buffer. By analog, the m+1-th bit lines of the first memory block to the y-th memory block are all connected to the m+1-th page buffer, and the m+12-th bit lines of the first memory block to the y-th memory block blocky are all connected to the m+2-th page buffer.

Referring to FIGS. 3 and 4, the sub-weight data W1 is written into a second memory cell of the first synaptic string of the first memory block block1.

Referring to FIGS. 3 and 4, the sub-weight data W2 is written into a second memory cell of the first synaptic string of the second memory block, and the sub-weight data W1 is written into a second memory cell of the second synaptic string of the second memory block.

Referring to FIGS. 3 and 4, the sub-weight data W3 is written into a second memory cell of the first synaptic string of the third memory block, the sub-weight data W2 is written into a second memory cell of the second synaptic string of the third memory block, and the sub-weight data W1 is written into a second memory cell of the third synaptic string of the third memory block.

Referring to FIGS. 3 and 4, the sub-weight data W3 is written into a second memory cell of the second synaptic string of the fourth memory block, and the sub-weight data W2 is written into a second memory cell of the third synaptic string of the fourth memory block.

Referring to FIGS. 3 and 4, the sub-weight data W3 is written into a second memory cell of the third synaptic string of the fifth memory block.

Referring to FIGS. 3 and 4, the sub-weight data W4 is written into a second memory cell of the first synaptic string of the sixth memory block, and the sub-weight data W1 is written into a second memory cell of the fourth synaptic string of the sixth memory block.

Referring to FIGS. 3 and 4, the sub-weight data W5 is written into a second memory cell of the first synaptic string of the seventh memory block, the sub-weight data W4 is written into a second memory cell of the second synaptic string of the seventh memory block, the sub-weight data W2 is written into a second memory cell of the fourth synaptic string of the seventh memory block, and the sub-weight data W1 is written into a second memory cell of the fifth synaptic string of the seventh memory block.

Referring to FIGS. 3 and 4, the sub-weight data W6 is written into a second memory cell of the first synaptic string of the eighth memory block, the sub-weight data W5 is written into a second memory cell of the second synaptic string of the eighth memory block, the sub-weight data W4 is written into a second memory cell of the third synaptic string of the eighth memory block, the sub-weight data W3 is written into a second memory cell of the fourth synaptic string of the eighth memory block, the sub-weight data W2 is written into a second memory cell of the fifth synaptic string of the eighth memory block, and the sub-weight data W1 is written into a second memory cell of the sixth synaptic string of the eighth memory block.

Referring to FIGS. 3 and 4, the sub-weight data W6 is written into a second memory cell of the second synaptic string of the ninth memory block, the sub-weight data W5 is written into a second memory cell of the third synaptic string of the ninth memory block, the sub-weight data W3 is written into a second memory cell of the fifth synaptic string of the ninth memory block, and the sub-weight data W2 is written into a second memory cell of the sixth synaptic string of the ninth memory block.

Referring to FIGS. 3 and 4, the sub-weight data W6 is written into a second memory cell of the third synaptic string of the tenth memory block, and the sub-weight data W3 is written into a second memory cell of the sixth synaptic string of the tenth memory block.

Referring to FIGS. 3 and 4, the sub-weight data W7 is written into a second memory cell of the first synaptic string of the eleventh memory block, the sub-weight data W4 is written into a second memory cell of the fourth synaptic string of the eleventh memory block, and the sub-weight data W1 is written into a second memory cell of the seventh synaptic string of the eleventh memory block.

Referring to FIGS. 3 and 4, the sub-weight data W8 is written into a second memory cell of the first synaptic string of the twelfth memory block, the sub-weight data W7 is written into a second memory cell of the second synaptic string of the twelfth memory block, the sub-weight data W5 is written into a second memory cell of the fourth synaptic string of the twelfth memory block, the sub-weight data W4 is written into a second memory cell of the fifth synaptic string of the twelfth memory block, the sub-weight data W2 is written into a second memory cell of the sixth synaptic string of the twelfth memory block, and the sub-weight data W1 is written into a second memory cell of the seventh synaptic string of the twelfth memory block.

Referring to FIGS. 3 and 4, the sub-weight data W9 is written into a second memory cell of the first synaptic string of the thirteenth memory block, the sub-weight data W8 is written into a second memory cell of the second synaptic string of the thirteenth memory block, the sub-weight data W7 is written into a second memory cell of the third synaptic string of the thirteenth memory block, the sub-weight data W6 is written into a second memory cell of the fourth synaptic string of the thirteenth memory block, the sub-weight data W5 is written into a second memory cell of the fifth synaptic string of the thirteenth memory block, the sub-weight data W4 is written into a second memory cell of the sixth synaptic string of the thirteenth memory block, the sub-weight data W3 is written into a second memory cell of the seventh synaptic string of the thirteenth memory block, the sub-weight data W2 is written into a second memory cell of the eighth synaptic string of the thirteenth memory block, and the sub-weight data W1 is written into a second memory cell of the ninth synaptic string of the thirteenth memory block.

Referring to FIGS. 3 and 4, the sub-weight data W9 is written into a second memory cell of the second synaptic string of the fourteenth memory block, the sub-weight data W8 is written into a second memory cell of the third synaptic string of the fourteenth memory block, the sub-weight data W6 is written into a second memory cell of the fifth synaptic string of the fourteenth memory block, the sub-weight data W5 is written into a second memory cell of the sixth synaptic string of the fourteenth memory block, the sub-weight data W3 is written into a second memory cell of the eighth synaptic string of the fourteenth memory block, and the sub-weight data W2 is written into a second memory cell of the ninth synaptic string of the fourteenth memory block.

Referring to FIGS. 3 and 4, the sub-weight data W9 is written into a second memory cell of the third synaptic string of the fifteenth memory block, the sub-weight data W6 is written into a second memory cell of the sixth synaptic string of the fifteenth memory block, and the sub-weight data W3 is written into a second memory cell of the ninth synaptic string of the fifteenth memory block.

Referring to FIGS. 3 and 4, the sub-weight data W7 is written into a second memory cell of the fourth synaptic string of the sixteenth memory block, and the sub-weight data W4 is written into a second memory cell of the seventh synaptic string of the sixteenth memory block.

Referring to FIGS. 3 and 4, the sub-weight data W8 is written into a second memory cell of the fourth synaptic string of the seventeenth memory block, the sub-weight data W7 is written into a second memory cell of the fifth synaptic string of the seventeenth memory block, the sub-weight data W5 is written into a second memory cell of the seventh synaptic string of the seventeenth memory block, and the sub-weight data W4 is written into a second memory cell of the eighth synaptic string of the seventeenth memory block.

Referring to FIGS. 3 and 4, the sub-weight data W9 is written into a second memory cell of the fourth synaptic string of the eighteenth memory block, the sub-weight data W8 is written into a second memory cell of the fifth synaptic string of the eighteenth memory block, the sub-weight data W7 is written into a second memory cell of the sixth synaptic string of the eighteenth memory block, the sub-weight data W6 is written into a second memory cell of the seventh synaptic string of the eighteenth memory block, the sub-weight data W5 is written into a second memory cell of the eighth synaptic string of the eighteenth memory block, and the sub-weight data W4 is written into a second memory cell of the ninth synaptic string of the eighteenth memory block.

Referring to FIGS. 3 and 4, the sub-weight data W9 is written into a second memory cell of the fifth synaptic string of the nineteenth memory block, the sub-weight data W8 is written into a second memory cell of the sixth synaptic string of the nineteenth memory block, the sub-weight data W6 is written into a second memory cell of the eighth synaptic string of the nineteenth memory block, and the sub-weight data W5 is written into a second memory cell of the ninth synaptic string of the nineteenth memory block.

Referring to FIGS. 3 and 4, the sub-weight data W9 is written into a second memory cell of the sixth synaptic string of the twentieth memory block, and the sub-weight data W9 is written into a second memory cell of the ninth synaptic string of the twentieth memory block.

Referring to FIGS. 3 and 4, the sub-weight data W7 is written into a second memory cell of the seventh synaptic string of the twenty-first memory block.

Referring to FIGS. 3 and 4, the sub-weight data W8 is written into a second memory cell of the seventh synaptic string of the twenty-second memory block, and the sub-weight data W7 is written into a second memory cell of the eighth synaptic string of the twenty-second memory block.

Referring to FIGS. 3 and 4, the sub-weight data W9 is written into a second memory cell of the seventh synaptic string of the twenty-third memory block, the sub-weight data W8 is written into a second memory cell of the eighth synaptic string of the twenty-third memory block, and the sub-weight data W7 is written into a second memory cell of the ninth synaptic string of the twenty-third memory block.

Referring to FIGS. 3 and 4, the sub-weight data W9 is written into a second memory cell of the ninth synaptic string of the twenty-fifth memory block.

Referring to FIGS. 3 and 4, a first target voltage is applied to all word lines of the first memory block. A second target voltage is applied to all word lines of the second memory block. A third target voltage is applied to all word lines of the third memory block. A fourth target voltage is applied to all word lines of the fourth memory block. A fifth target voltage is applied to all word lines of the fifth memory block. A sixth target voltage is applied to all word lines of the sixth memory block. A seventh target voltage is applied to all word lines of the seventh memory block. An eighth target voltage is applied to all word lines of the eighth memory block. A ninth target voltage is applied to all word lines of the ninth memory block. A tenth target voltage is applied to all word lines of the tenth memory block. An eleventh target voltage is applied to all word lines of the eleventh memory block. A twelfth target voltage is applied to all word lines of the twelfth memory block. A thirteenth target voltage is applied to all word lines of the thirteenth memory block. A fourteenth target voltage is applied to all word lines of the fourteenth memory block. A fifteenth target voltage is applied to all word lines of the fifteenth memory block. A sixteenth target voltage is applied to all word lines of the sixteenth memory block. A seventeenth target voltage is applied to all word lines of the seventeenth memory block. An eighteenth target voltage is applied to all word lines of the eighteenth memory block. A nineteenth target voltage is applied to all word lines of the nineteenth memory block. A twentieth target voltage is applied to all word lines of the twentieth memory block. A twenty-first target voltage is applied to all word lines of the twenty-first memory block. A twenty-second target voltage is applied to all word lines of the twenty-second memory block. A twenty-third target voltage is applied to all word lines of the twenty-third memory block. A twenty-fourth target voltage is applied to all word lines of the twenty-fourth memory block. A twenty-fifth target voltage is applied to all word lines of the twenty-fifth memory block.

The first target voltage is the sub-feature data A1. The second target voltage is the sub-feature data A2. The third target voltage is the sub-feature data A3. The fourth target voltage is the sub-feature data A4. The fifth target voltage is the sub-feature data A5. The sixth target voltage is the sub-feature data A6. The seventh target voltage is the sub-feature data A7. The eighth target voltage is the sub-feature data A8. The ninth target voltage is the sub-feature data A9. The tenth target voltage is the sub-feature data A10. The eleventh target voltage is the sub-feature data A11. The twelfth target voltage is the sub-feature data A12. The thirteenth target voltage is the sub-feature data A13. The fourteenth target voltage is the sub-feature data A14. The fifteenth target voltage is the sub-feature data A15. The sixteenth target voltage is the sub-feature data A16. The seventeenth target voltage is the sub-feature data A17. The eighteenth target voltage is the sub-feature data A18. The nineteenth target voltage is the sub-feature data A19. The twentieth target voltage is the sub-feature data A20. The twenty-first target voltage is the sub-feature data A21. The twenty-second target voltage is the sub-feature data A22. The twenty-third target voltage is the sub-feature data A23. The twenty-fourth target voltage is the sub-feature data A24. The twenty-fifth target voltage is the sub-feature data A25.

With reference to FIG. 3, the NAND flash memory further includes a data selector. The data selector is connected to the memory block, to transmit signals to the word lines, the drain-side selection gate lines, and the source-side selection gate lines of the memory blocks.

Referring to FIGS. 2 to 4, when the page buffer senses the current of the memory block, the drain-side selectors in the first memory block to the twenty-fifth memory block. The current of the first page buffer corresponds to A1×W1+A2×W2+A3×W3+A6×W4+A7×W5+A8×W6+A11×W7+A12×W8+A13×W9, to obtain the first sub-convolution result B1. The current of the second page buffer corresponds to A2×W1+A3×W2+A4×W3+A7×W4+A8×W5+A9×W6+A12×W7+A13×W8+A14×W9, to obtain the second sub-convolution result B2. The current of the third page buffer corresponds to A3+A4+A5+A8+A9+A10+A13+A14+A15, to obtain the third sub-convolution result B3. The current of the fourth page buffer corresponds to A6+A7+A8+A11+A12+A13+A16+A17+A18, to obtain the fourth sub-convolution result B4. The current of the fifth page buffer corresponds to A7+A8+A9+A12+A13+A14+A17+A18+A19, to obtain the fifth sub-convolution result B5. The current of the sixth page buffer corresponds to A8+A9+A10+A13+A14+A15+A18+A19+A20, to obtain the sixth sub-convolution result B6. The current of the seventh page buffer corresponds to A11+A12+A13+A16+A17+A18+A21+A22+A23, to obtain the seventh sub-convolution result B7. The current of the eighth page buffer corresponds to A12+A13+A14+A17+A18+A19+A22+A23+A24, to obtain the eighth sub-convolution result B8. The current of the ninth page buffer corresponds to A13+A14+A15+A18+A19+A20+A23+A24+A25, to obtain the ninth sub-convolution result B9.

Figure 5:
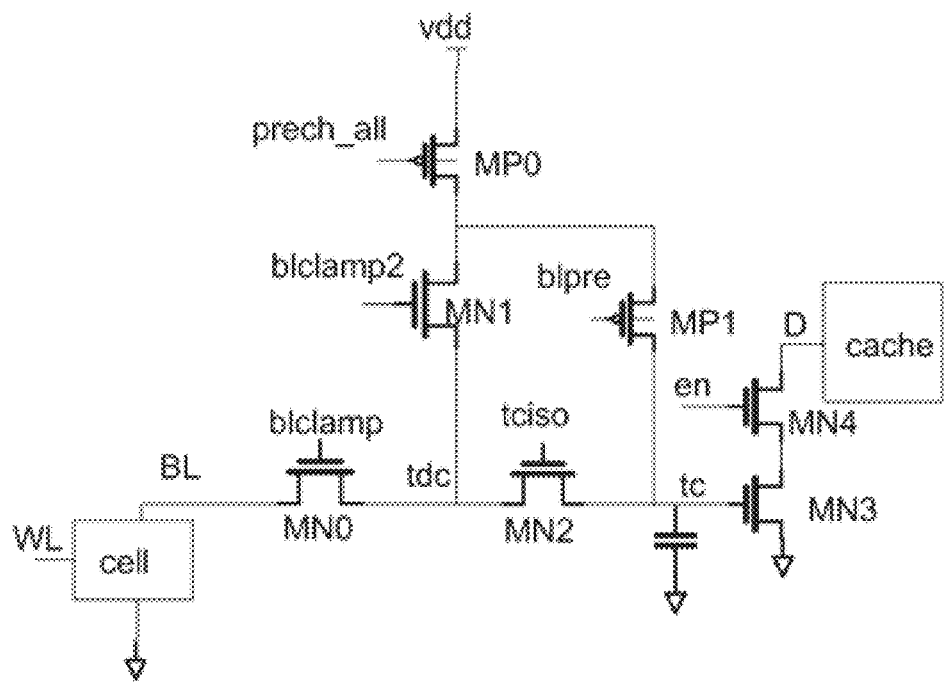
FIG. 5 is a schematic diagram of a circuit of a page buffer according to some embodiments of the present invention.

FIG. 5 is a schematic diagram of a circuit of a page buffer according to some embodiments of the present invention. Referring to FIG. 5, the page buffer includes a first PMOS transistor MP0, a second PMOS transistor MP1, a first NMOS transistor MN0, a second NMOS transistor MN1, a third NMOS transistor MN2, a fourth NMOS transistor MN3, a fifth NMOS transistor MN4, a capacitor C, and a cache memory. The source of the first PMOS transistor MP0 is connected to the power supply voltage vdd. The gate of the first PMOS transistor MP0 is connected to the first control signal prech_all. The drain of the first PMOS transistor MP0 is connected to the drain of the second NMOS transistor MN1 and the source of the second PMOS transistor MP1. The gate of the second NMOS transistor MN1 is connected to the second control signal blclamp2. The gate of the second PMOS transistor MP1 is connected to the third control signal blpre. The source of the second NMOS transistor MN1 is connected to the drain of the first NMOS transistor MN0 and the source of the third NMOS transistor MN2, with tdc as the connection point. The gate of the first NMOS transistor MN0 is connected to the fourth control signal blclamp. The source of the first NMOS transistor MN0 is connected to the bit line BL. The gate of the third NMOS transistor MN2 is connected to the fifth control signal tciso. The drain of the second PMOS transistor MP1 is connected to the gate of the fourth NMOS transistor MN3, one terminal of the capacitor C, and the drain of the third NMOS transistor MN2, with tc as the connection point. The other terminal of the capacitor C and the source of the fourth NMOS transistor MN3 are connected to ground. The drain of the fourth NMOS transistor MN3 is connected to the source of the fifth NMOS transistor MN4. The drain D of the fifth NMOS transistor MN4 is connected to the cache memory. The gate of the fifth NMOS transistor MN4 is connected to the sixth control signal en.

Figure 6:
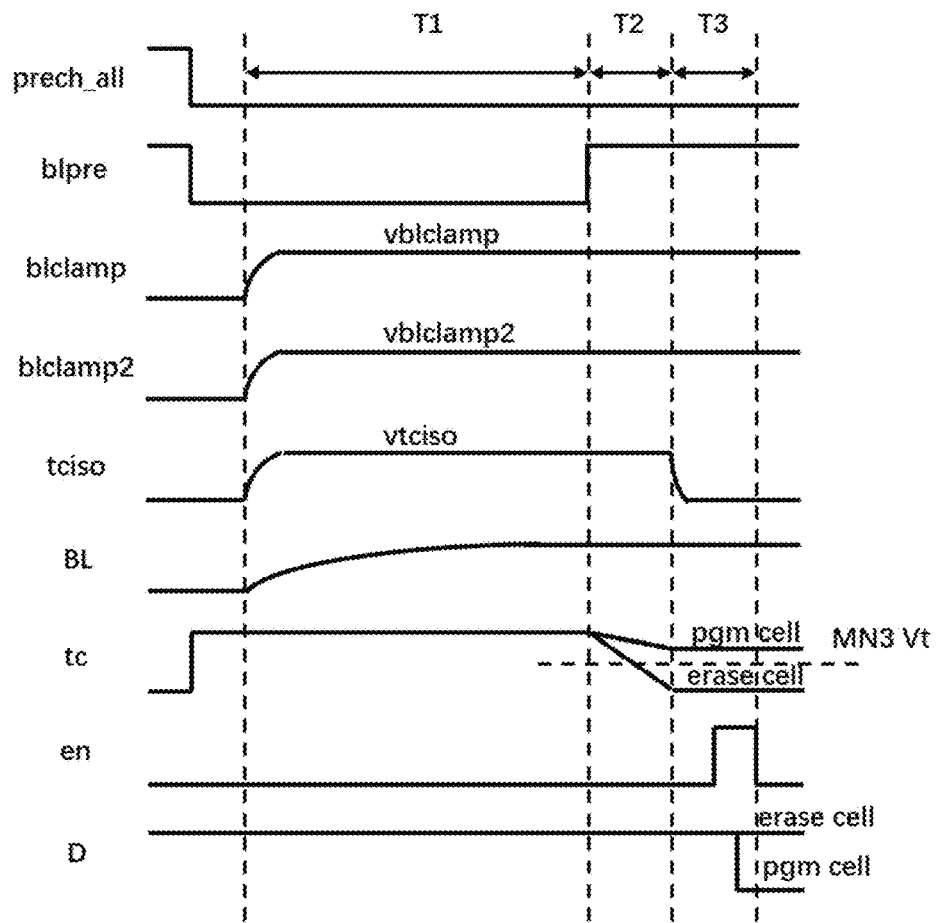
FIG. 6 is a schematic diagram of a time sequence of the page buffer in FIG. 5 according to some embodiments of the present invention.

FIG. 6 is a schematic diagram of a time sequence of the page buffer in FIG. 5 according to some embodiments of the present invention. In FIG. 6, T1 represents the first stage, T2 represents the second stage, T3 represents the third stage, and MN3 Vt represents the threshold voltage of the fourth NMOS transistor. pam cell represents the memory cell in the programmed state, and erase cell represents the memory cell in the erased state. vblclamp represents the voltage when the fourth control signal is at a high level. vblclamp2 represents the voltage when the second control signal blclamp2 is at a high level. vtciso represents the voltage when the fifth control signal is at a high level.

Figure 7:
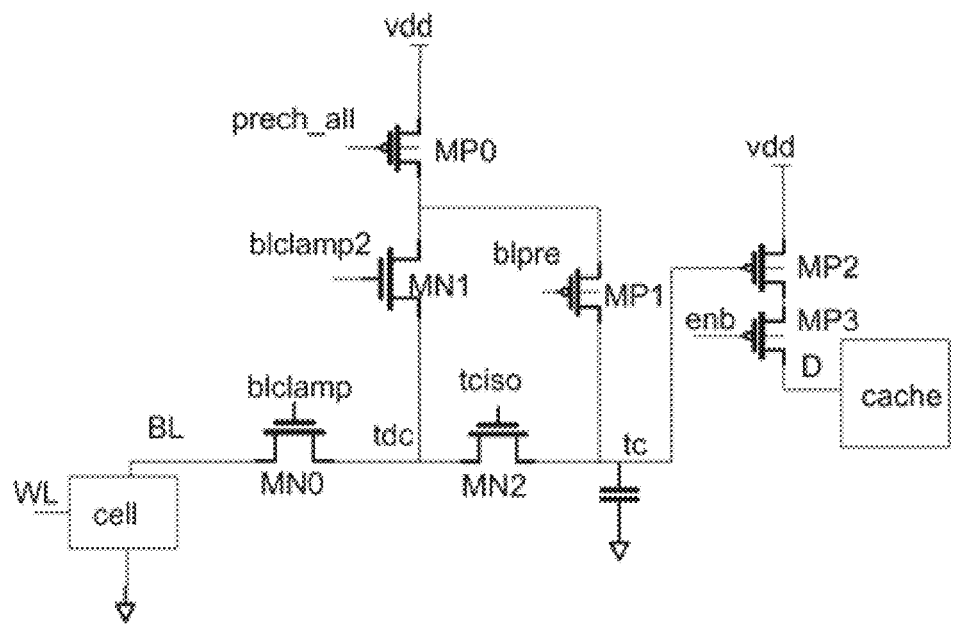
FIG. 7 is a schematic diagram of a circuit of a page buffer according to some other embodiment of the present invention.

FIG. 7 is a schematic diagram of a circuit of a page buffer according to some other embodiments of the present invention. Referring to FIG. 7, the page buffer includes the first PMOS transistor MP0, the second PMOS transistor MP1, the third PMOS transistor MP2, the fourth PMOS transistor MP3, the first NMOS transistor MN0, the second NMOS transistor MN1, the third NMOS transistor MN2, a capacitor C, and a cache memory. The source of the first PMOS transistor MP0 is connected to the power supply voltage vdd. The gate of the first PMOS transistor MP0 is connected to the first control signal prech_all. The drain of the first PMOS transistor MP0 is connected to the drain of the second NMOS transistor MN1 and the source of the second PMOS transistor MP1. The gate of the second NMOS transistor MN1 is connected to the second control signal blclamp2. The gate of the second PMOS transistor MP1 is connected to the third control signal blpre. The source of the second NMOS transistor MN1 is connected to the drain of the first NMOS transistor MN0 and the source of the third NMOS transistor MN2, with tdc as the connection point. The gate of the first NMOS transistor MN0 is connected to the fourth control signal blclamp. The source of the first NMOS transistor MN0 is connected to bit line BL. The gate of the third NMOS transistor MN2 is connected to the fifth control signal tciso. The drain of the second PMOS transistor MP1 is connected to the gate of the third PMOS transistor MP3, one terminal of the capacitor C, and the drain of the third NMOS transistor MN2, with tc as the connection point. The other terminal of capacitor C is connected to ground. The source of the third PMOS transistor MP2 is connected to the power supply voltage vdd. The drain of the third PMOS transistor MP2 is connected to the source of the fourth PMOS transistor MP3. The drain D of the fourth PMOS transistor MP3 is connected to the cache memory, and the gate of the fourth PMOS transistor MP3 is connected to the sixth control signal enb.

Figure 8:
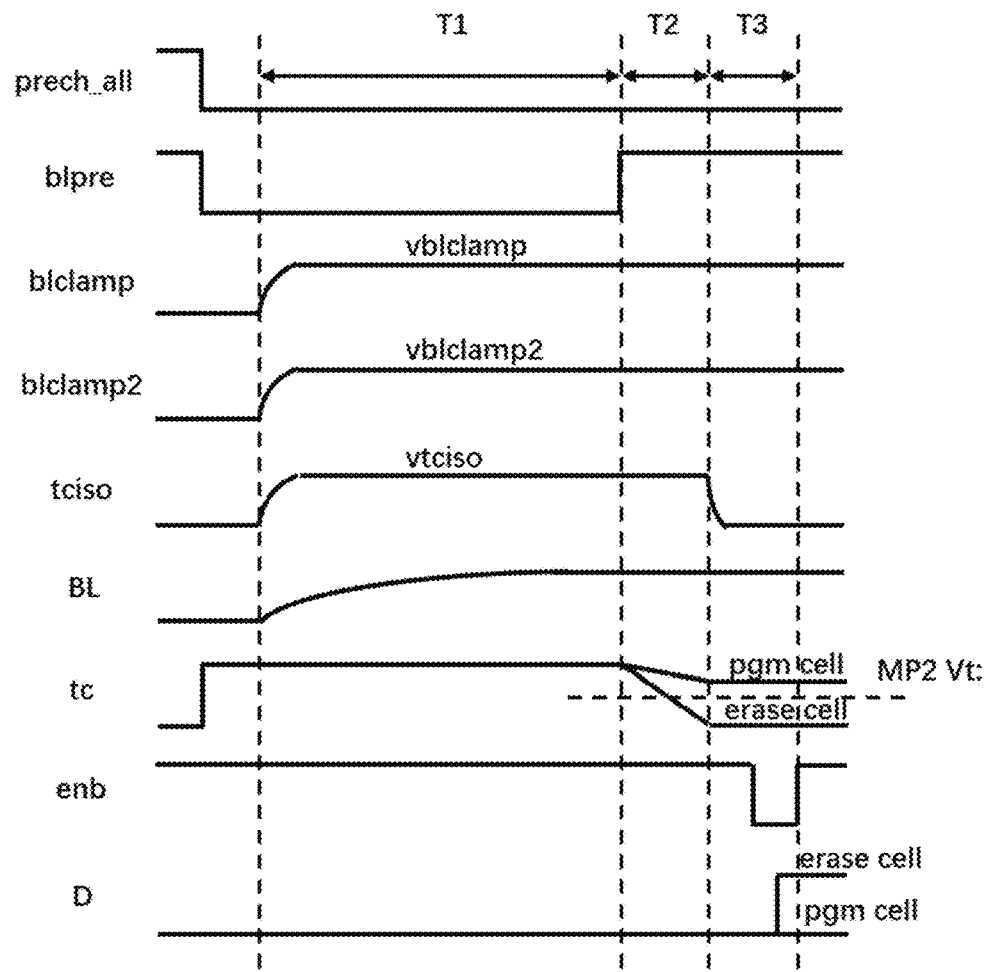
FIG. 8 is a schematic diagram of a time sequence of the page buffer in FIG. 7 according to some embodiments of the present invention.

FIG. 8 is a schematic diagram of a time sequence of the page buffer in FIG. 7 according to some embodiments of the present invention. In FIG. 8, T1 represents the first stage, T2 represents the second stage, T3 represents the third stage, and MP2 Vt represents the threshold voltage of the three PMOS transistor. pam cell represents the memory cell in the programmed state, and erase cell represents the memory cell in the erased state. vblclamp represents the voltage when the fourth control signal is at a high level. vblclamp2 represents the voltage when the second control signal blclamp2 is at a high level. vtciso represents the voltage when the fifth control signal is at a high level.

In some embodiments, the sensing, by the page buffer, a current of the memory block, to obtain a convolution result includes: dividing a sensing time of the page buffers into N sections; discharging a pre-charge voltage of the page buffer via the bit line until the pre-charge voltage of the page buffers is smaller than a threshold voltage, and recoding this time period as an M-th section; and obtaining the convolution result according to M and N, M and N being natural numbers greater than 0. Referring to FIG. 5, the voltage at the connection point tc is the pre-charge voltage of the page buffer, and the threshold voltage is the threshold voltage of the fourth NMOS transistor. Sections before the M-th section represent as 0, and sections from the M-th section onwards represent 1. In some specific embodiments, for example, when N is 10 and M is 5, the sub-convolution result is 0000111111.

In some embodiments, the method for controlling a NAND flash memory to complete neural network operation further includes a calibration step, where the calibration step includes: by using a memory cell with known weight data and feature data as a reference unit, calibrating the sensing time of the page buffers with reference to a current of the reference unit that is sensed by a corresponding one of the page buffers.

While detailed embodiments of the present invention have been described above, it is evident to those skilled in the art that various modifications and changes can be made to these embodiments. However, it should be understood that such modifications and changes fall within the scope and spirit of the present invention as described in the claims. Further- more, the present invention, as described herein, may have other embodiments and may be implemented or realized in various ways.

What is claimed is:

1. A method for controlling a NAND flash memory to complete neural network operation, comprising the following steps:
S0: providing a NAND flash memory, wherein the NAND flash memory comprises multiple memory blocks and multiple page buffers, the memory block comprises multiple synaptic strings, multiple bit lines, and multiple word lines, the synaptic string comprises multiple memory cells connected in series, the synaptic strings are connected to the bit lines in one-to-one correspondence, the word line is connected to all the synaptic strings, the page buffer is connected to all the memory blocks, and one of the bit lines is merely connected to one of the page buffers;
S1: writing weight data into the memory cell according to a relationship between the weight data and feature data;
S2: applying a target voltage to the memory cell by the word line; and
S3: sensing, by the page buffer, a current of the memory block, to obtain a convolution result; and
the method further comprising a calibration step, wherein the calibration step comprises:
by using a memory cell with known weight data and feature data as a reference unit, calibrating the sensing time of the page buffers with reference to a current of the reference unit that is sensed by a corresponding one of the page buffers.

2. The method for controlling a NAND flash memory to complete neural network operation according to claim 1, wherein the feature data comprises multiple pieces of sub-feature data, the weight data comprises multiple pieces of sub-weight data, each sub-feature data corresponds to one of the memory blocks, and one of the pieces of sub-feature data corresponds to at least one of the pieces of sub-weight data.

3. The method for controlling a NAND flash memory to complete neural network operation according to claim 2, wherein the writing weight data into the memory cell according to a relationship between the weight data and the feature data comprises:
according to a correspondence between the sub-weight data and the sub-feature data, writing all pieces of sub-weight data corresponding to one of the pieces of sub-feature data into different memory cells of a memory block corresponding to the sub-feature data, and the different memory cells are connected to a common word line.

4. The method for controlling a NAND flash memory to complete neural network operation according to claim 3, wherein the target voltage comprises multiple sub-target voltages, the sub-target voltages are in one-to-one correspondence to the pieces of sub-feature data, and the applying a target voltage to the memory cell by the word line comprises:
applying the sub-target voltages corresponding to the sub-feature data to all memory cells of the memory blocks corresponding to the sub-feature data, and holding the sub-target voltages through the word lines.

5. The method for controlling a NAND flash memory to complete neural network operation according to claim 1, wherein the convolution result comprises multiple sub-convolution results, the multiple sub-convolution results are used as new feature data, and steps 1 to 3 are repeated for performing a next layer of convolution operation.

6. The method for controlling a NAND flash memory to complete neural network operation according to claim 1, wherein the sensing, by the page buffer, a current of the memory block, to obtain a convolution result comprises:
   dividing a sensing time of the page buffers into N sections;
   discharging a pre-charge voltage of the page buffers via the bit line until the pre-charge voltage of the page buffer is smaller than a threshold voltage, and recoding this time period as an M-th section; and
   obtaining the convolution result based on M and N, M and N being natural numbers greater than 0.

* * * * *